US009494094B2

(12) United States Patent
Hara et al.

(10) Patent No.: US 9,494,094 B2
(45) Date of Patent: Nov. 15, 2016

(54) ENGINE ROTATIONAL SPEED CONTROL DEVICE

(71) Applicant: Yanmar Co., Ltd., Osaka-shi, Osaka (JP)

(72) Inventors: Naohiro Hara, Osaka (JP); Jun Watanabe, Osaka (JP); Hiroaki Wakahara, Osaka (JP); Akiyoshi Hayashi, Osaka (JP); Takao Nakanishi, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 192 days.

(21) Appl. No.: 14/397,924

(22) PCT Filed: Apr. 15, 2013

(86) PCT No.: PCT/JP2013/061211

§ 371 (c)(1),
(2) Date: Oct. 30, 2014

(87) PCT Pub. No.: WO2013/164946

PCT Pub. Date: Nov. 7, 2013

(65) Prior Publication Data

US 2015/0094934 A1 Apr. 2, 2015

(30) Foreign Application Priority Data

May 1, 2012 (JP) ................................ 2012-104668

(51) Int. Cl.
*B60T 7/12* (2006.01)
*F02D 41/04* (2006.01)
(Continued)

(52) U.S. Cl.
CPC ............... *F02D 41/04* (2013.01); *F02D 11/10* (2013.01); *F02D 11/105* (2013.01);
(Continued)

(58) Field of Classification Search
CPC ............. F02D 2200/1012; F02P 5/145; F02P 5/1512; F02P 5/1455
USPC ............ 701/101, 104, 111; 123/319, 406.16, 123/406.21, 406.23, 406.24, 406.29, 406.3
See application file for complete search history.

(56) References Cited

U.S. PATENT DOCUMENTS 4,969,440 A * 11/1990 Murakami ............. F02P 5/152 123/406.37
5,845,491 A * 12/1998 Yasui ................. F02D 41/1403 123/674

(Continued)

FOREIGN PATENT DOCUMENTS

JP 1-125538 A 5/1989
JP 5-1610 A 1/1993

(Continued)

OTHER PUBLICATIONS

International Preliminary Report on Patentability (PCT/ISA/338 & PCT/IPEA/409) dated Nov. 6, 2014 (Five (5) pages).

(Continued)

*Primary Examiner* — John Kwon
(74) *Attorney, Agent, or Firm* — Crowell & Moring LLP

(57) ABSTRACT

An engine rotational speed control device (4) includes a noise removal processing unit (6) which corrects a command value, wherein the noise removal processing unit (6) is configured to set a current first output value (B(i)) to be identical to a previous first output value (B(i−1)) in a case where, in a latest step group, the number of successive increase steps is smaller than a first predetermined number (n) and the number of successive decrease steps is smaller than the first predetermined number (n), the increase step is a step in which a current first input value (A(i)) is greater than the previous first output value (B(i−1)) by a first set width (n) or more, and the decrease step is a step in which the current first input value (A(i)) is smaller than the previous first output value (B(i)) by the first set width (n) or more.

3 Claims, 7 Drawing Sheets

(51) Int. Cl.

| | |
|---|---|
| ***F02D 11/10*** | (2006.01) |
| ***F02D 31/00*** | (2006.01) |
| *F02D 41/12* | (2006.01) |
| *F02D 41/14* | (2006.01) |
| *F02D 41/00* | (2006.01) |
| *F02D 41/28* | (2006.01) |

(52) U.S. Cl.

CPC ........ *F02D 31/001* (2013.01); *F02D 41/0007* (2013.01); *F02D 41/12* (2013.01); *F02D 41/1498* (2013.01); *F02D 2041/286* (2013.01); *F02D 2200/602* (2013.01)

(56) References Cited

U.S. PATENT DOCUMENTS

2006/0180363 A1* 8/2006 Uchisasai ................ B60K 6/48
180/65.275

2015/0122012 A1* 5/2015 Tokuyasu .............. G01F 1/6842
73/204.22

FOREIGN PATENT DOCUMENTS

| | | | |
|---|---|---|---|
| JP | 10-103090 | A | 4/1998 |
| JP | 11-351030 | A | 12/1999 |
| JP | 2000-204979 | A | 7/2000 |
| JP | 2006-240509 | A | 9/2006 |
| JP | 2006-284528 | A | 10/2006 |
| JP | 2010-223345 | A | 10/2010 |

OTHER PUBLICATIONS

International Search Report dated Jun. 25, 2013 with English translation (five (5) pages).

Japanese-language International Preliminary Report on Patentability (PCT/IPEA/409) dated Jun. 9, 2014 (three (3) pages).

* cited by examiner

ENGINE ROTATIONAL SPEED CONTROL DEVICE

TECHNICAL FIELD

The present invention relates to an engine rotational speed control device.

BACKGROUND ART

There is an electronically controlled engine whose target rotational speed can be directly specified by an operator. Such an engine includes an operation lever, an AD conversion device, and an engine rotational speed control device for setting the target rotational speed. The AD conversion device generates a command value of the target rotational speed for each step per unit time by digital converting an analog value that is input by the operation lever. The engine rotational speed control device controls the amount of fuel supply based on the generated command value.

The error in AD conversion, a signal noise, a slight vibration in the operation lever, and the like cause an error to occur in the command value of the target rotational speed. As a result, the command value of the target rotational speed varies in the range of several LSBs (Least Significant Bit) with respect to the analog value of the target rotational speed input by the operator. A slight variation in the target rotational speed may cause hunting of the engine. Especially, such hunting occurs when the target rotational speed corresponds to the switching rotational speed of fuel injection patterns. In this case, the target rotational speed varies across the switching rotational speed, and the fuel injection pattern is frequently switched. The operator gets a strange feeling regarding the operation state of the engine because the operator hears frequent variation in the engine sound even though the operator is not operating the operation lever.

Patent Document 1 discloses an example of a technique for correcting a control signal. In paragraph 0025 of Patent Document 1, an averaging process on a calculation value of the accelerator opening is described. According to paragraph 0027 of Patent Document 1, a radical increase in the pressure inside an intake passage at the time of deceleration when a turbo charger 31 is operating can be prevented by this averaging process.

PATENT DOCUMENT

Patent Document 1: JP 11-351030 A

SUMMARY OF THE INVENTION

Problems to be Solved by the Invention

The averaging process provides an effect of suppressing a drastic variation. However, even if such an averaging process is applied in correction of a command value of the target rotational speed, a slight variation in the target rotational speed cannot be removed by only the averaging process. The averaging process merely reduces an instantaneous variation or a short-cycle variation, and cannot remove unnecessary variation itself.

Accordingly, the present invention provides an engine rotational speed control device capable of removing slight variation in the command value of target rotational speed which is not intended by the operator.

Solutions to the Problems

An engine rotational speed control device according to the present invention is an engine rotational speed control device for controlling an amount of fuel supply based on a command value of target rotational speed generated for each step per unit time by digital converting an analog value of the target rotational speed input by an operation device, the engine rotational speed control device including a noise removal processing unit which corrects the command value, a first input value being the command value that is input to the noise removal processing unit, and a first output value being the command value that is output from the noise removal processing unit, wherein the noise removal processing unit is configured to set a current first output value to be identical to a previous first output value in a case where, in a latest step group, the number of successive increase steps is smaller than a first predetermined number and the number of successive decrease steps is smaller than the first predetermined number, the increase step is the step in which the current first input value is greater than the previous first output value by a first set width or more, and the decrease step is the step in which the current first input value is smaller than the previous first output value by the first set width or more.

The engine rotational speed control device includes a moving average unit which corrects the command value after correction by the noise removal processing unit, a second input value being the command value that is input to the moving average unit, and a second output value being the command value that is output from the moving average unit, wherein the moving average unit is configured to calculate a moving average value based on a latest second predetermined number of the second input values, and to set a current second output value to be identical to the moving average value, and the engine rotational speed control device includes a dead zone processing unit which corrects the command value after correction by the noise removal processing unit, a third input value being the command value that is input to the dead zone processing unit, and a third output value being the command value that is output from the dead zone processing unit, wherein the dead zone processing unit is configured to set a current third output value to be identical to a previous third output value in a case where a current step is a small variation step, and the small variation step is the step in which an absolute value of difference between a current third input value and the previous third output value is smaller than a second set width.

In the engine rotational speed control device, the dead zone processing unit is configured to set the current third output value to be identical to the current third input value instead of setting the current third output value to be identical to the previous third output value in a case where, in a latest step group, duration of a signal-present step is equal to or longer than a predetermined period of time, and the signal-present step is the small variation step in which the absolute value of the difference between the current third input value and the previous third output value is greater than zero.

Effects of the Invention

The engine rotational speed control device according to the present invention is capable of removing slight variation in the command value of target rotational speed which is not intended by the operator. Accordingly, this control device can prevent occurrence of hunting.

EMBODIMENT OF THE INVENTION

Configuration of Present Embodiment

Figure 1:
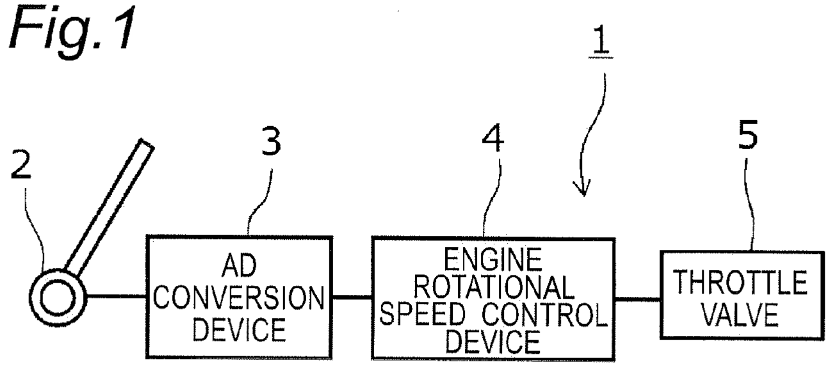
FIG. 1 is a block diagram showing a configuration of an engine related to target rotational speed.

FIG. 1 is a block diagram showing a configuration of an engine 1 related to target rotational speed. The engine 1 includes an operation lever (operation device) 2, an AD conversion device 3, an engine rotational speed control device 4, and a throttle valve 5. The operation lever 2 is an input device for setting the target rotational speed of the engine 1, and is operated by an operator. The AD conversion device 3 digital converts an analog value of the target rotational speed input by the operation lever 2. A command value of the target rotational speed is thereby generated for each step per unit time. The control device 4 creates a target opening of the throttle valve 5 based on the generated command value. The amount of air intake and the amount of fuel supply are changed according to the opening of the throttle valve 5, and the output of the engine 1 is changed. In the present embodiment, the engine 1 is of an injector type, and the amount of fuel supply is automatically changed according to the amount of air intake. Here, the control device 4 controls the amount of fuel supply through control of the throttle valve 5.

In the following, correction of a command value by the control device 4 (FIG. 3) according to the present embodiment will be described in comparison with correction of a command value by a control device 104 (FIG. 2) according to a reference mode.

Figure 2:
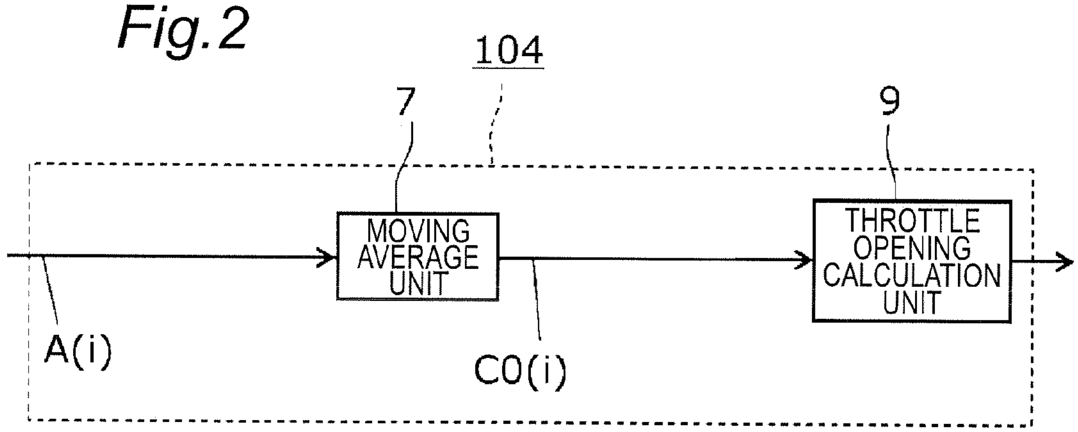
FIG. 2 is a block diagram showing a configuration of a control device according to a reference mode.

FIG. 2 is a block diagram showing a configuration of the control device 104 according to the reference mode. The control device 104 includes a moving average unit 7, and a throttle opening calculation unit 9. The moving average unit 7 corrects a command value of target rotational speed. Details of correction will be given later. The throttle opening calculation unit 9 creates target opening of a throttle valve 5 based on the corrected command value.

Figure 3:
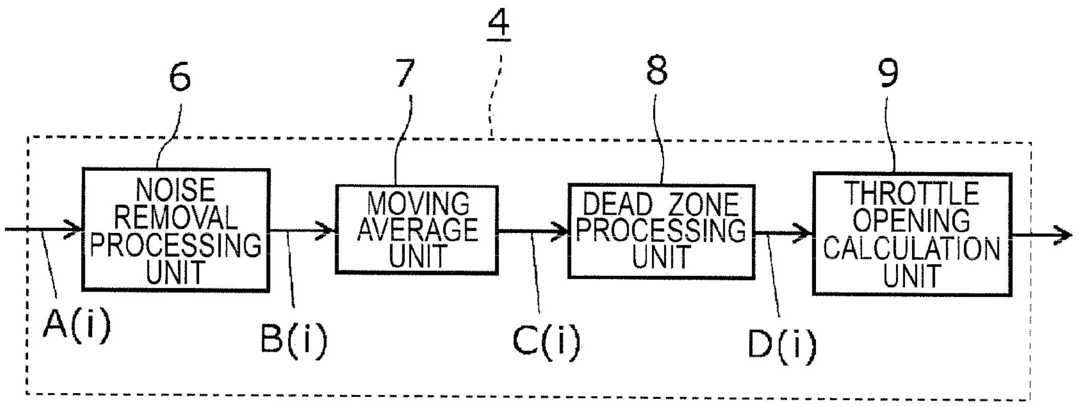
FIG. 3 is a block diagram showing a configuration of a control device according to a present embodiment.

FIG. 3 is a block diagram showing a configuration of the control device 4 according to the present embodiment. The control device 4 includes a noise removal processing unit 6, a moving average unit 7, a dead zone processing unit 8, and a throttle opening calculation unit 9. The noise removal processing unit 6, the moving average unit 7, and the dead zone processing unit 8 correct a command value of target rotational speed. A command value is first corrected at the noise removal processing unit 6, is then corrected at the moving average unit 7, and is lastly corrected at the dead zone processing unit 8. Details of correction will be given later. The throttle opening calculation unit 9 creates target opening of a throttle valve 5 based on the corrected command value.

Correction by the noise removal processing unit 6 and the moving average unit 7 will be described with reference to FIGS. 4 to 14. In the description, the flow chart of FIG. 4 is referred to as appropriate while referring to FIGS. 5 to 14 showing changes over time of command values.

FIGS. 5 to 14 and FIGS. 16 to 20 each show a change over time of a command value. In these figures, the horizontal axis shows time (step), and the vertical axis shows the level of a command value. Here, the level of a command value is not expressed by an exponent corresponding to the number of bits mentioned below, but by a regular expression. Also, the dashed line indicates the true value of a command value. The true value of a command value represents a command value intended by the operation of the operation lever 2 by an operator.

Figure 4:
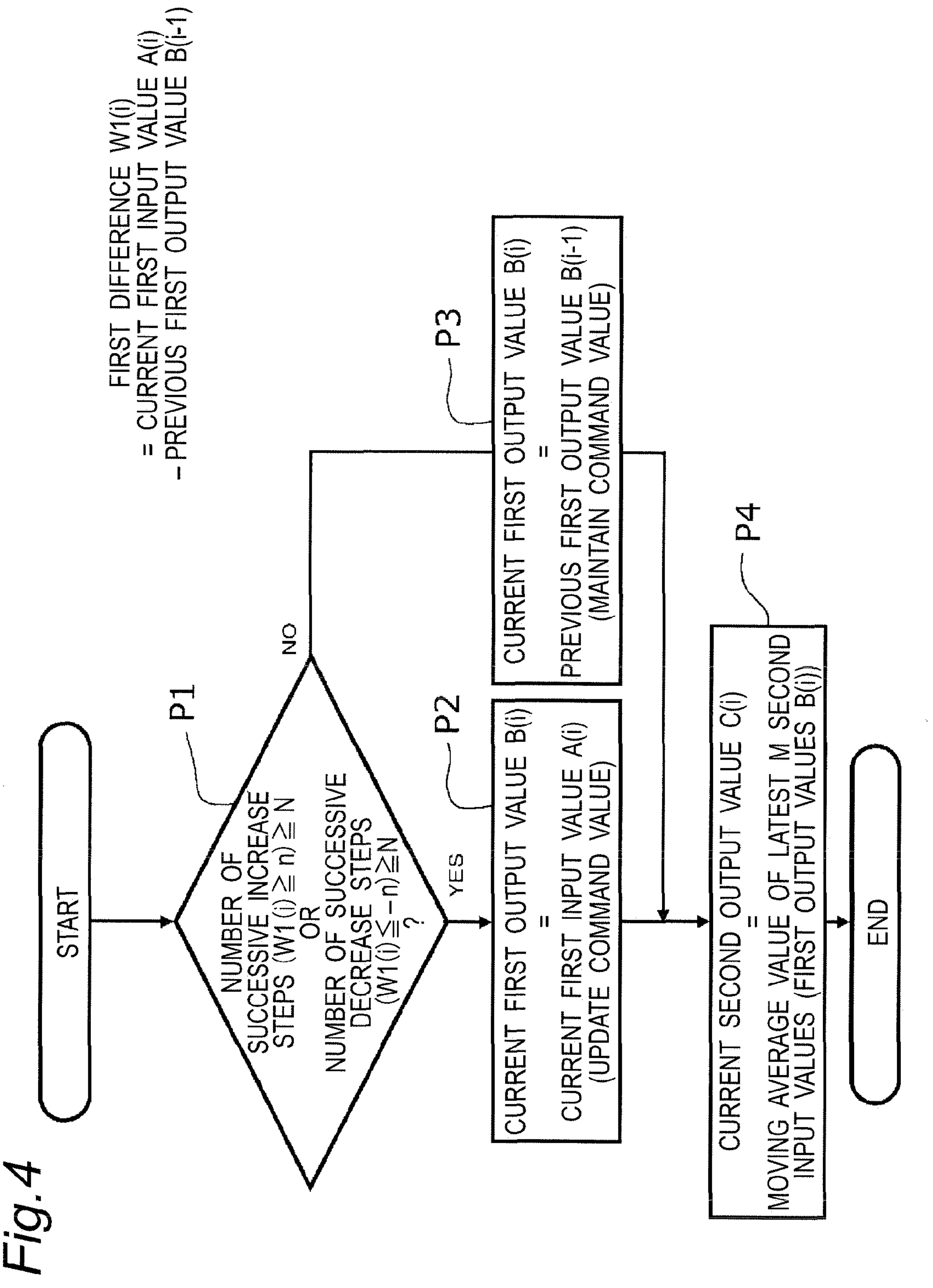
FIG. 4 is a flow chart showing an execution flow of a noise removal process and a moving average process.

FIG. 4 is a flow chart showing an execution flow of a noise removal process and a moving average process. Processes P1 to P3 are handled by the noise removal processing unit 6, and a process P4 is handled by the moving average unit 7. Details of the processes P1 to P4 will be given later.

Figure 5:
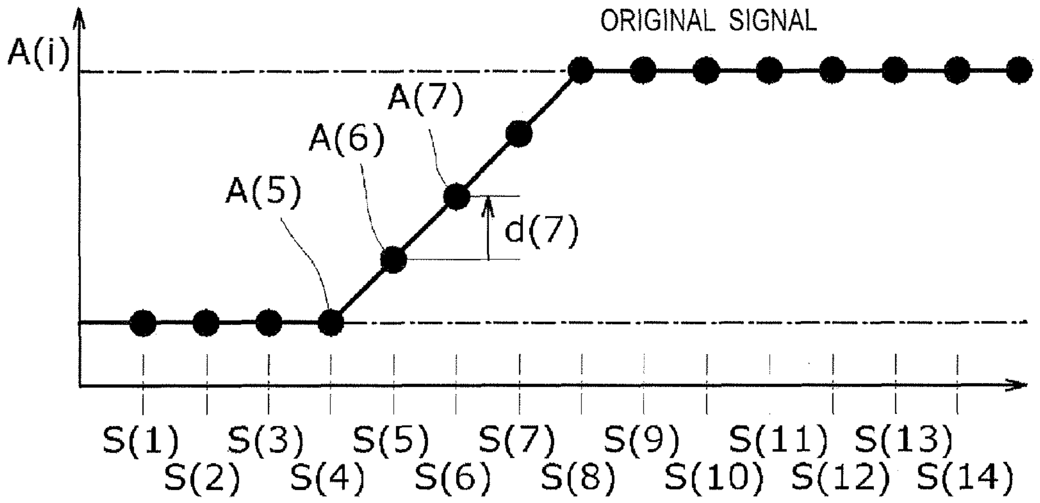
FIG. 5 is a diagram showing a change over time of a command value that is input from an AD conversion device to the control device at the time of acceleration.

FIG. 5 is a diagram showing a change over time of a command value that is input from the AD conversion device 3 to the control device 4 at the time of acceleration. A command value is input to the control device 4 for each step. A first input value A(i) refers to a command value A(i) that is input to the control device 4 (the noise removal processing unit 6) in step S(i). A variation width d(i) refers to the value that is obtained by subtracting a previous first input value A(i−1) from the current first input value A(i). Here, the symbol i is a natural number, and the increase in the symbol i indicates passing of the time. The first input value A(i) takes the same value between steps S(1) and S(4). Also, the first input value A(i) takes the same value in step S(8) and subsequent steps. On the other hand, between steps S(4) and S(8), the first input value A(i) is increased, and the variation width d(i) is three bits or more.

Figure 6:
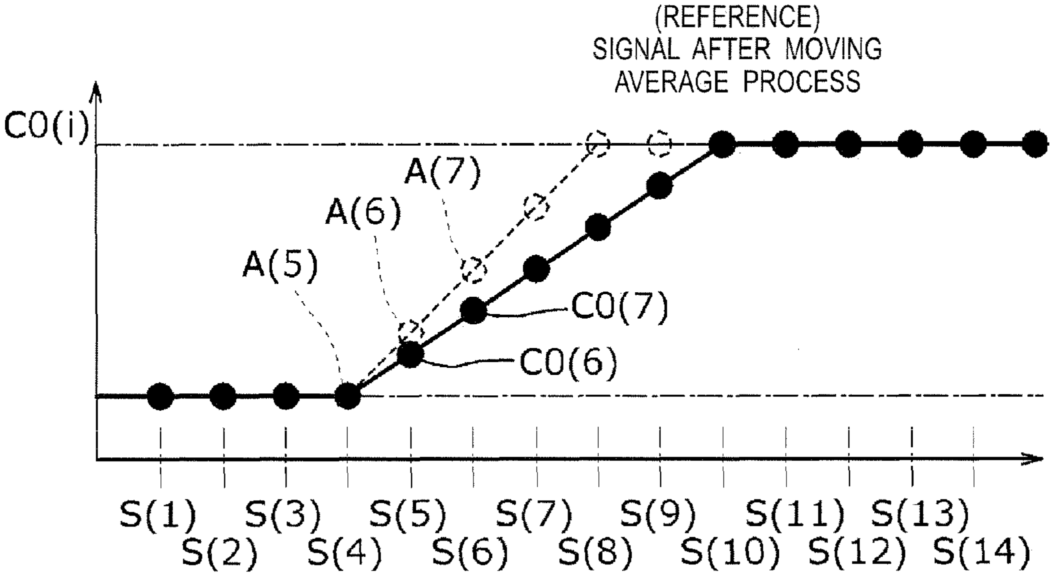
FIG. 6 is a diagram showing a change over time of a command value that is output from a moving average unit of the control device of the reference mode at the time of acceleration.

FIG. 6 is a diagram showing a change over time of a command value that is output from the moving average unit 7 of the control device 104 of the reference mode at the time of acceleration. The moving average unit 7 calculates a moving average value based on the latest three first input values A(i−2), A(i−1), and A(i), and sets a current first reference output value C0(*i*) to be identical to the moving average value. The first reference output value C0(*i*) refers to the command value that is output from the moving average unit 7. The first input value A(i) is increased between steps S(4) and S(8), and the first reference output value C0(*i*) is accordingly increased between steps S(4) and S(10).

Figure 7:
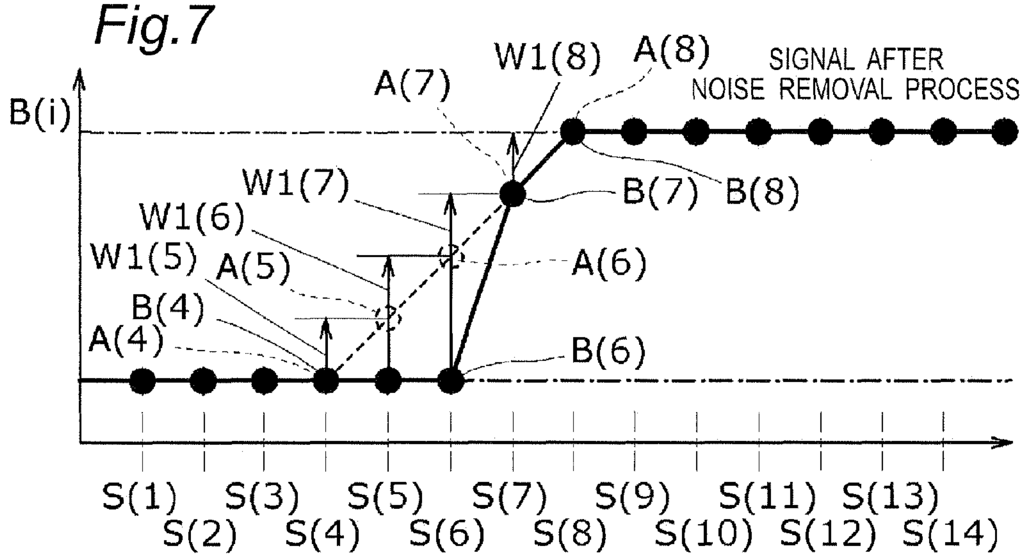
FIG. 7 is a diagram showing a change over time of a command value that is output from a noise removal processing unit of the control device at the time of acceleration.

FIG. 7 is a diagram showing a change over time of a command value that is output from the noise removal processing unit 6 of the control device 4 at the time of acceleration. Correction by the noise removal processing unit 6 is schematically described as follows. In the case where the first input value A(i) is continuously increased, or in the case where the first input value A(i) is continuously decreased, the noise removal processing unit 6 outputs, as a current first output value B(i), the current first input value A(i) as it is without correction. That is, the command value is updated according to the current first input value A(i). On the other hand, in other cases, the noise removal processing unit 6 ignores the current first input value A(i), and sets the current first output value B(i) to be identical to a previous first output value B(i−1). That is, the command value is maintained regardless of the current first input value A(i). In this case, the current first input value A(i) is removed as a noise.

Specifically, correction described above is performed as follows.

First, an increase in the first input value A(i) is determined based on presence of an increase step. An increase step is a step in which the current first input value A(i) is greater than the previous first output value B(i−1) by a first set width n or more. A first difference W1(*i*) shown in FIG. 7 is a difference that is obtained by subtracting the previous first output value B(i−1) from the current first input value A(i). Therefore, if the first difference W1(*i*) is greater than zero by the first set width n or more, the current step S(i) is an increase step. In addition, in the case where the number of successive increase steps is a first predetermined number N or more, it is determined that the first input value A(i) is continuously increased. Also, a decrease step is a step in which the current first input value A(i) is smaller than the previous first output value B(i−1) by the first set width n or more. If the first difference W1(*i*) is smaller than zero by the first set width n or more, the current step S(i) is a decrease step. In the case where the number of successive decrease steps is the first predetermined number N or more, it is determined that the first input value A(i) is continuously decreased. In the present embodiment, the first predetermined number N is three, and the first set width n is three bits.

The condition of the process P1 in FIG. 4 is satisfied when, in a latest step group, the number of successive increase steps is equal to or greater than the first predetermined number N or the number of successive decrease steps is equal to or greater than the first predetermined number N. If the condition of the process P1 is satisfied, the process P2 is carried out, and if the condition of the process P1 is not satisfied, the process P3 is carried out. In the process P2, the noise removal processing unit 6 sets the current first output value B(i) to be identical to the current first input value A(i). That is, the command value is newly updated. In the process P3, the noise removal processing unit 6 sets the current first output value B(i) to be identical to the previous first output value B(i−1). That is, the command value is maintained.

Referring to FIG. 7, steps S(4) to S(9) will be described in relation to correction by the noise removal processing unit 6. The noise removal processing unit 6 detects, based on the first difference W1(*i*), that the current step S(i) is an increase step, a decrease step, or a neutral step. As described above, if the first difference W1(*i*) is greater than zero by the first set width n or more, the current step S(i) is an increase step. If the first difference W1(*i*) is smaller than zero by the first set width n or more, the current step S(i) is a decrease step. In other cases, the current step S(i) is a neutral step. Moreover, the noise removal processing unit 6 stores the first difference W1(*i*) obtained in the past step to specify continuation of the increase steps or continuation of the decrease steps.

First, the process in step S(4) will be described. When considering a current first difference W1(4), since a current first input value A(4) is equal to a previous first output value B(3), the current first difference W1(4) is zero. Accordingly, the current step S(4) is a neutral step. The number of successive decrease steps is zero, and the number of successive increase steps is also zero, and both are smaller than three (the first predetermined number N). Thus, the noise removal processing unit 6 ignores the current first input value A(4), and sets a current first output value B(4) to be identical to the previous first output value B(3).

Next, the process in step S(5) will be described. When considering a current first difference W1(5), a current first input value A(5) is greater than the previous first output value B(4) by three bits or more. Accordingly, the current step S(5) is an increase step. However, the previous step S(4) is a neutral step. The number of successive increase steps is one, and is smaller than three (the first predetermined number N). Thus, the noise removal processing unit 6 ignores the current first input value A(5), and sets a current first output value B(5) to be identical to the previous first output value B(4).

Next, the process in step S(6) will be described. When considering a current first difference W1(6), a current first input value A(6) is greater than the previous first output value B(5) by three bits or more. Accordingly, the current step S(6) is an increase step. Since steps S(5) and S(6) are increase steps, the number of successive increase steps is two. However, the number of successive increase steps is smaller than three (the first predetermined number N). Thus, the noise removal processing unit 6 ignores the current first input value A(6), and sets a current first output value B(6) to be identical to the previous first output value B(5).

Next, the process in step S(7) will be described. When considering a current first difference W1(7), a current first input value A(7) is greater than the previous first output value B(6) by three bits or more. Accordingly, the current step S(7) is an increase step. Since steps S(5), S(6), and S(7) are increase steps, the number of successive increase steps is three. The number of successive increase steps is equal to three (the first predetermined number N). Thus, the noise removal processing unit 6 does not ignore the current first input value A(7), and sets a current first output value B(7) to be identical to the current first input value A(7). That is, the command value is updated.

Next, the process in step S(8) will be described. When considering a current first difference W1(8), a current first input value A(8) is greater than the previous first output value B(7) by three bits or more. Accordingly, the current step S(8) is an increase step. Since steps S(5) to S(8) are increase steps, the number of successive increase steps is four. The number of successive increase steps is greater than three (the first predetermined number N). Thus, the noise removal processing unit 6 does not ignore the current first input value A(8), and sets a current first output value B(8) to be identical to the current first input value A(8).

Next, the process in step S(9) will be described. When considering a current first difference W1(9), a current first input value A(9) is equal to the previous first output value B(8), and thus, the current first difference W1(9) is zero. The current step S(9) is a neutral step. Thus, the noise removal processing unit 6 ignores the current first input value A(9), and sets a current first output value B(9) to be identical to the previous first output value B(8).

As in the process in step S(4), in the case where there is no change in the first input value in step S(3) and preceding steps, the current first output value B(i) is set to be identical to the previous first output value B(i−1) in each of step S(3) and preceding steps. Similarly, as in the process in step S(9), in the case where there is no change in the first input value in step S(10) and subsequent steps, the current first output value B(i) is set to be identical to the previous first output value B(i−1) in each of step S(10) and subsequent steps.

Correction is performed in the same manner as above also in the case where there are successive decrease steps instead of successive increase steps.

When the processes of the process P2 or the process P3 is finished, the process P4 is carried out.

Figure 8:
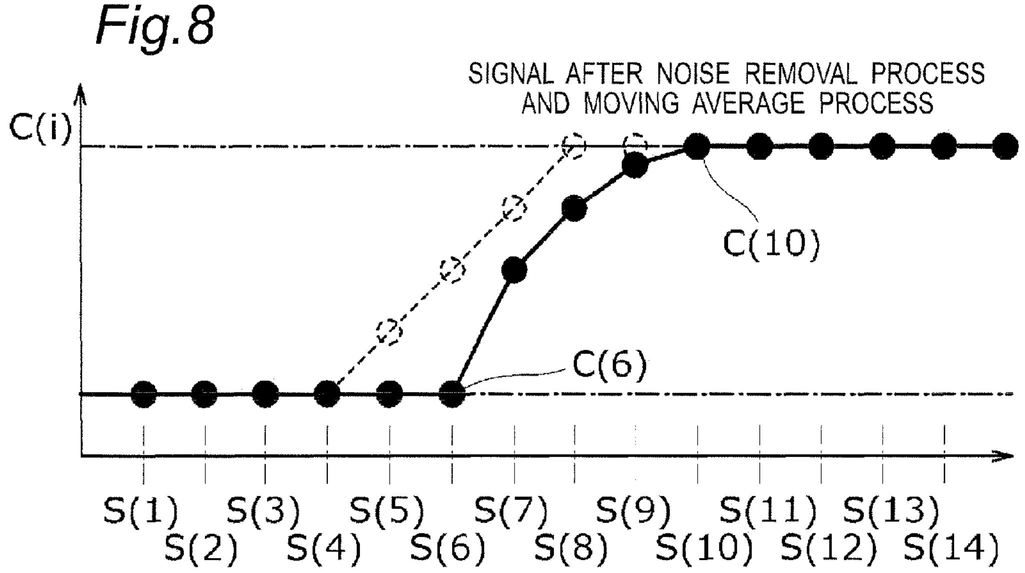
FIG. 8 is a diagram showing a change over time of a command value that is output from the moving average unit of the control device at the time of acceleration.

FIG. 8 is a diagram showing a change over time of a command value that is output from the moving average unit 7 of the control device 4 at the time of acceleration. The moving average unit 7 of the control device 4 is configured to calculate a moving average value based on latest M second input values, and to set a current second output value C(i) to be identical to the moving average value. In the present embodiment, M is three. This is the process that is carried out in the process P4. Additionally, the second input value refers to a command value that is input to the moving average unit 7 in step S(i). With the control device 4 according to the present embodiment, a first output value B(i) is input from the noise removal processing unit 6 to the moving average unit 7, and thus, the second input value is equal to the first output value B(i). Also, the second output value C(i) refers to the command value that is output from the moving average unit 7.

In the present embodiment, the moving average unit 7 calculates a moving average value based on latest three first output values B(i−2), B(i−1), and B(i), and sets the current second output value C(i) to be identical to the moving average value. In FIG. 7, the first output value B(i) is increased between steps S(6) and S(8), and accordingly, the second output value C(i) is increased between steps S(6) and S(10), as shown in FIG. 8.

Figure 9:
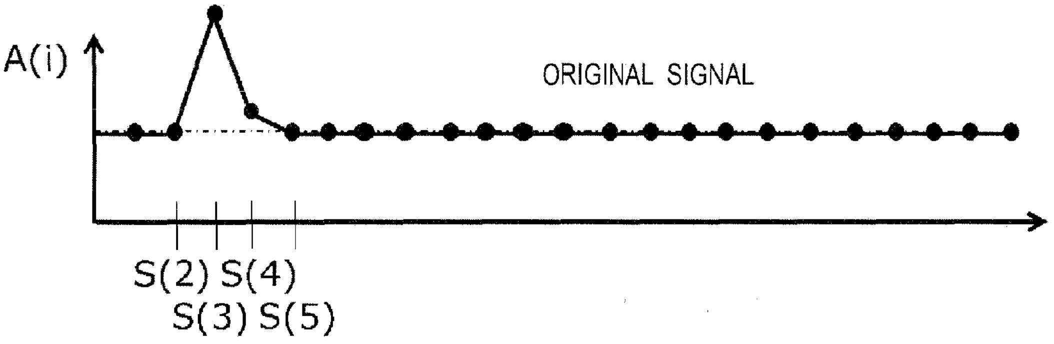
FIG. 9 is a diagram showing a change over time of a command value that is input from the AD conversion device to the control device at the time of occurrence of an instantaneous noise.

FIG. 9 is a diagram showing a change over time of a command value that is input from the AD conversion device 3 to the control device 4 at the time of occurrence of an instantaneous noise. In FIG. 9, a whisker-shaped, instantaneous noise is caused between steps S(2) and S(5).

Figure 10:
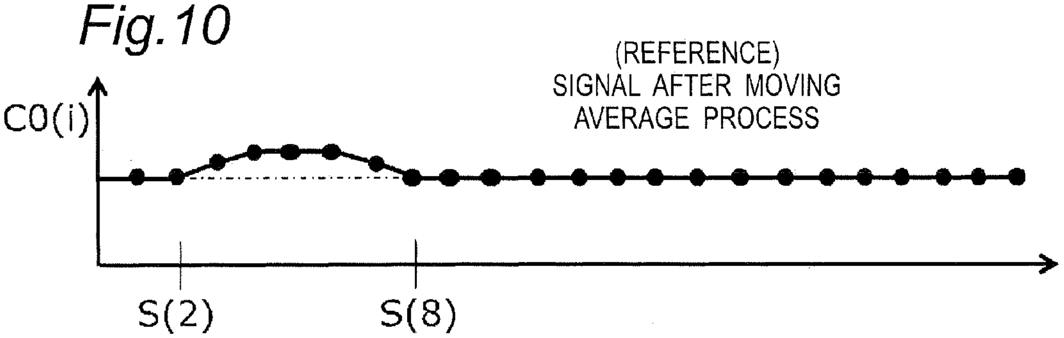
FIG. 10 is a diagram showing a change over time of a command value that is output from the moving average unit of the control device of the reference mode at the time of occurrence of an instantaneous noise.

FIG. 10 is a diagram showing a change over time of a command value that is output from the moving average unit 7 of the control device 104 of the reference mode at the time of occurrence of an instantaneous noise. A first reference output value C0(*i*) is increased between steps S(2) and S(8) in accordance to occurrence of an instantaneous noise. Although the instantaneous noise is reduced, it is not removed.

Figure 11:
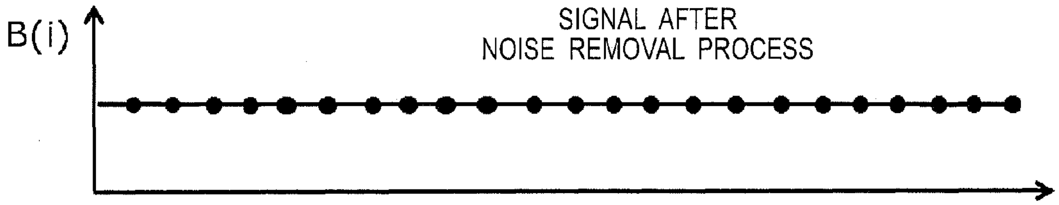
FIG. 11 is a diagram showing a change over time of a command value that is output from a noise removal processing unit 6 of the control device at the time of acceleration.

FIG. 11 is a diagram showing a change over time of a command value that is output from the noise removal processing unit 6 of the control device 4 at the time of acceleration. In FIG. 9, step S(3) is an increase step, and steps S(4) and S(5) are decrease steps. The number of successive increase steps is one, and the number of successive decrease steps is two, and both are smaller than three (the first predetermined number N). Thus, while the state in FIG. 9 continues, the noise removal processing unit 6 ignores the current first input value A(i), and sets the current first output value B(i) to be identical to the previous first output value B(i−1). As a result, the instantaneous noise is completely removed.

Figure 12:
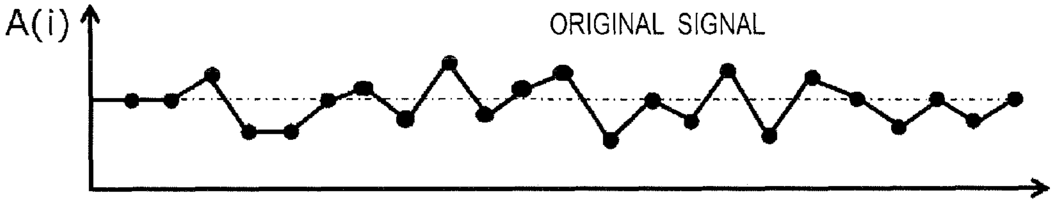
FIG. 12 is a diagram showing a change over time of a command value that is input from the AD conversion device to the control device at the time of occurrence of a short-cycle noise.

FIG. 12 is a diagram showing a change over time of a command value that is input from the AD conversion device 3 to the control device 4 at the time of occurrence of a short-cycle noise. In FIG. 12, there is successive occurrence of short-cycle noises.

Figure 13:
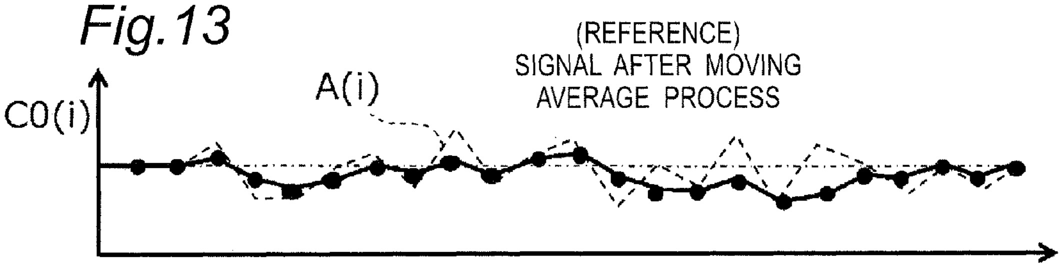
FIG. 13 is a diagram showing a change over time of a command value that is output from the moving average unit of the control device of the reference mode at the time of occurrence of a short-cycle noise.

FIG. 13 is a diagram showing a change over time of a command value that is output from the moving average unit 7 of the control device 104 of the reference mode at the time of occurrence of a short-cycle noise. The first reference output value C0(*i*) varies in accordance with occurrence of the short-cycle noise. The short-cycle noise is reduced, but is not removed.

Figure 14:
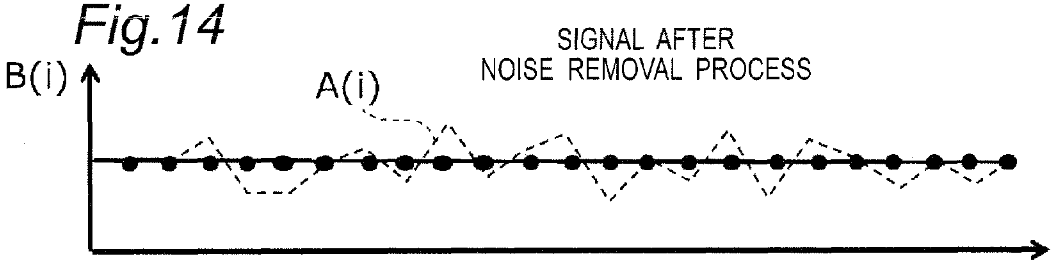
FIG. 14 is a diagram showing a change over time of a command value that is output from the noise removal processing unit of the control device at the time of occurrence of a short-cycle noise.

FIG. 14 is a diagram showing a change over time of a command value that is output from the noise removal processing unit 6 of the control device 4 at the time of occurrence of a short-cycle noise. In FIG. 12, the number of successive increase steps is smaller than three (the first predetermined number N) at any time, and the number of successive decrease steps is also smaller than three (the first predetermined number N) at any time. Thus, while the state in FIG. 12 continues, the noise removal processing unit 6 ignores the current first input value A(i), and sets the current first output value B(i) to be identical to the previous first output value B(i−1). As a result, the short-cycle noise is completely removed.

When the process of the process P4 is finished, the execution flow of the noise removal process and the moving average process is ended.

Figure 15:
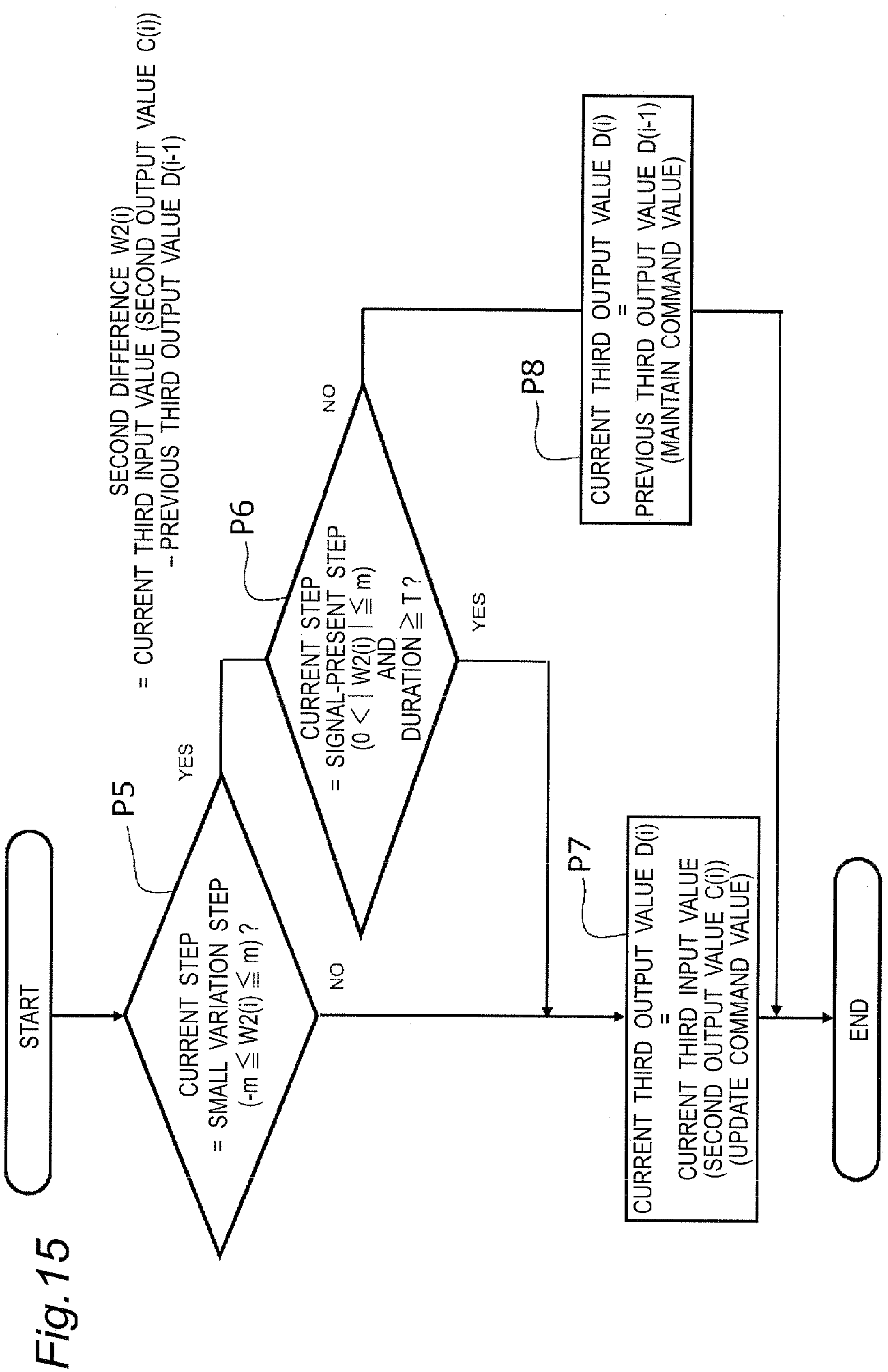
FIG. 15 is a flow chart showing an execution flow of a dead zone process.

Referring to FIGS. 15 to 20, correction by the dead zone processing unit 8 will be described. In this description, the flow chart of FIG. 15 is referred to as appropriate while referring to FIGS. 16 to 20 showing changes over time of command values.

FIG. 15 is a flow chart showing an execution flow of a dead zone process. The execution flow of FIG. 15 is performed after the execution flow of FIG. 4. Processes P5 to P8 are handled by the dead zone processing unit 8. Details of the processes P5 to P8 are given later.

Figure 16:
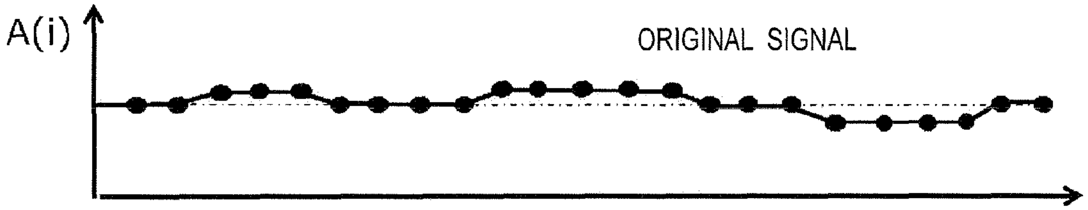
FIG. 16 is a diagram showing a change over time of a command value that is input from the AD conversion device to the control device at the time of occurrence of a long-cycle, low-amplitude noise.

FIG. 16 is a diagram showing a change over time of a command value that is input from the AD conversion device 3 to the control device 4 at the time of occurrence of a long-cycle, low-amplitude noise. In FIG. 16, there is constant occurrence of a long-cycle, low-amplitude noise.

Figure 17:
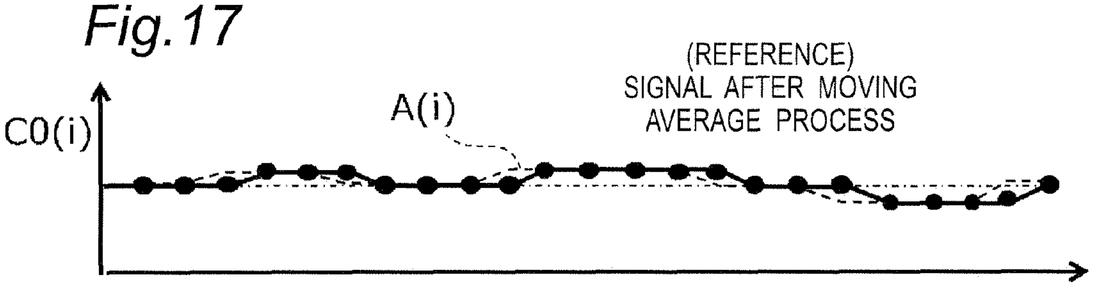
FIG. 17 is a diagram showing a change over time of a command value that is output from the moving average unit of the control device of the reference mode at the time of occurrence of a long-cycle, low-amplitude noise.

FIG. 17 is a diagram showing a change over time of a command value that is output from the moving average unit 7 of the control device 104 of the reference mode at the time of occurrence of a long-cycle, low-amplitude noise. The first reference output value C0(*i*) varies in accordance with occurrence of a long-cycle, low-amplitude noise. Since the noise has a long cycle and a low amplitude, the noise is not much reduced. That is, the phase of the first reference output value C0(*i*) is delayed relative to the phase of the first input value A(i), but the maximum amplitude of the first reference output value C0(*i*) is not much reduced than the maximum amplitude of the first input value A(i).

Figure 18:
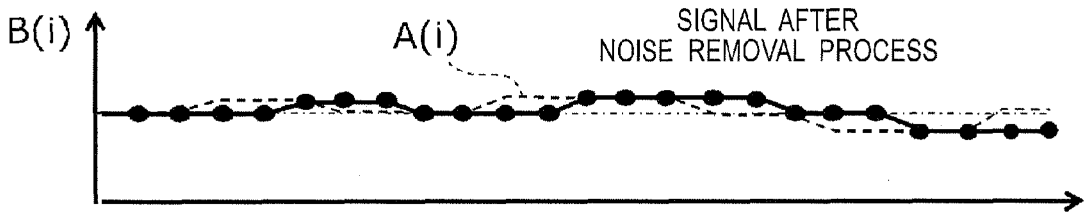
FIG. 18 is a diagram showing a change over time of a command value that is output from the noise removal processing unit of the control device at the time of occurrence of a long-cycle, low-amplitude noise.

FIG. 18 is a diagram showing a change over time of a command value that is output from the noise removal processing unit 6 of the control device 4 at the time of occurrence of a long-cycle, low-amplitude noise. In FIG. 18, the number of successive increase steps is three (the first predetermined number N) or more, and the number of successive decrease steps is also three (the first predetermined number N) or more. Thus, the noise removal processing unit 6 does not ignore the first input values A(i) thereof. As a result, a first output value B(i) is generated in such a way that the phase of the first output value B(i) is delayed relative to the phase of the first input value A(i). That is, the long-cycle, low-amplitude noise remains.

Additionally, the command value that is output from the noise removal processing unit 6 is further processed by the moving average unit 7, but the command value that is output from the moving average unit 7 is not greatly varied from the command value that is output from the noise removal processing unit 6 except for the delay in the phase. As described above, in the case of a long-cycle, low-amplitude noise, the maximum amplitude of the command value is not much reduced by the moving average process.

Figure 19:
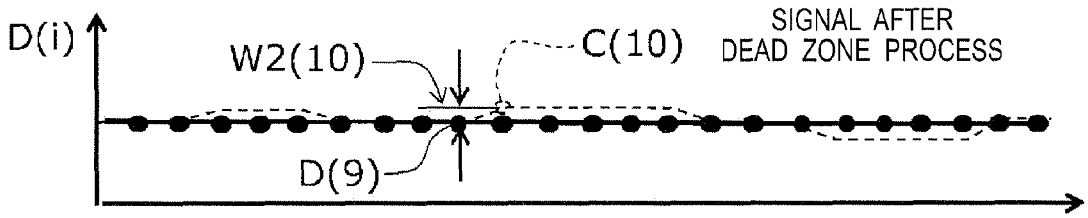
FIG. 19 is a diagram showing a change over time of a command value that is output from a dead zone processing unit of the control device at the time of occurrence of a long-cycle, low-amplitude noise.

FIG. 19 is a diagram showing a change over time of a command value that is output from the dead zone processing unit 8 of the control device 4 at the time of occurrence of a long-cycle, low-amplitude noise. In FIG. 19, the broken line indicates a second output value C(i), and the solid line indicates a third output value D(i). The dead zone processing unit 8 generates the third output value D(i) based on a third input value. The third input value is a command value that is input to the dead zone processing unit 8. The third input value is equal to the second output value C(i) that is output from the noise removal processing unit 6.

Correction by the dead zone processing unit 8 is schematically described as follows. In the case where the third input value varies relatively greatly, the dead zone processing unit 8 outputs the current third input value as it is as the current third output value D(i) without correcting the current third input value. That is, the command value is updated according to the current third input value. On the other hand, in the case where the third input value is not much varied, the dead zone processing unit 8 ignores the current third input value, and sets the current third output value D(i) to be identical to the previous third output value D(i−1). That is, the command value is maintained regardless of the current third input value. In this case, the current third input value is removed as a noise.

Specifically, correction described above is performed as follows.

First, the degree of variation in the third input value is determined based on existence of a small variation step. A small variation step is a step in which the absolute value of the difference between the current third input value (the second output value C(i)) and the previous third output value D(i−1) is smaller than a second set width m. If the current step is the small variation step, it is determined that the third input value is not much varied. The dead zone processing unit 8 detects whether or not the current step S(i) is the small variation step based on a second difference W2(*i*). The second difference W2(*i*) is a difference that is obtained by subtracting the previous third output value D(i−1) from the current third input value.

The size of the second set width m is set so as to be able to remove a noise which has not been removed by correction by the noise removal processing unit 6. Here, the command value is reduced by the moving average process by the moving average unit 7, and thus, the absolute value of the second difference W2(*i*) is generally smaller than the absolute value of the first difference W1(*i*). Accordingly, even if the absolute value of the first difference W1(*i*) is equal to or greater than the first set width n, there is a possibility that the absolute value of the second difference W2(*i*) will be smaller than the first set width n. Accordingly, in the present embodiment, the second set width m is set to the same value as the first set width n, and the second set width m is three bits. Thus, the dead zone processing unit 8 can remove a noise which has not been removed by the noise removal processing unit 6. Additionally, the second set width m does not have to be identical to the first set width n. As described above, the second difference W2(*i*) varies with respect to the first difference W1(*i*) due to the influence of moving average. Accordingly, the second set width m may be set to be smaller or greater than the first set width n according to the number of moving averages, for example.

Accordingly, a noise as described below is the long-cycle, low-amplitude noise that is removed by the dead zone processing unit 8. The "long-cycle" means that the increase steps or the decrease steps are equal to or greater than the first predetermined number N. The "low-amplitude" means that the absolute value of the first difference W1(*i*) is equal to or greater than the first set width n, and that the absolute value of the second difference W2(*i*) is smaller than the second set width m.

Referring to FIG. 15, the condition of the process P5 is satisfied when the current step S(i) is a small variation step. If the condition of the process P5 is satisfied, the process P8 is basically carried after determination in the process P6. In the process P8, the dead zone processing unit 8 sets the current third output value D(i) to be identical to the previous third output value D(i−1). That is, the command value is maintained regardless of the current third input value. In this case, the current third input value is removed as a noise. On the other hand, if the condition of the process P5 is not satisfied, the process P7 is performed. In the process P7, the dead zone processing unit 8 sets the current third output value D(i) to be identical to the current third input value. That is, the command value is updated according to the current third input value.

Determination in the process P6 is provided so as to handle the third input value as a meaningful signal without removing the third input value as a noise in the case where the third input value continues for a long time. In the process P6, the dead zone processing unit 8 sets the current third output value D(i) to be identical to the current third input value in the case where duration of a signal-present step is equal to or greater than a predetermined period of time T. The signal-present step refers to a small variation step in which the absolute value of the difference between the current third input value and the previous third output value D(i−1) is greater than zero. If the condition of the process P6 is satisfied, the process P7 is carried out. That is, the current third input value is exceptionally not removed as a noise. On the other hand, if the condition of the process P6 is not satisfied, the process P8 described above is carried out.

Figure 20:
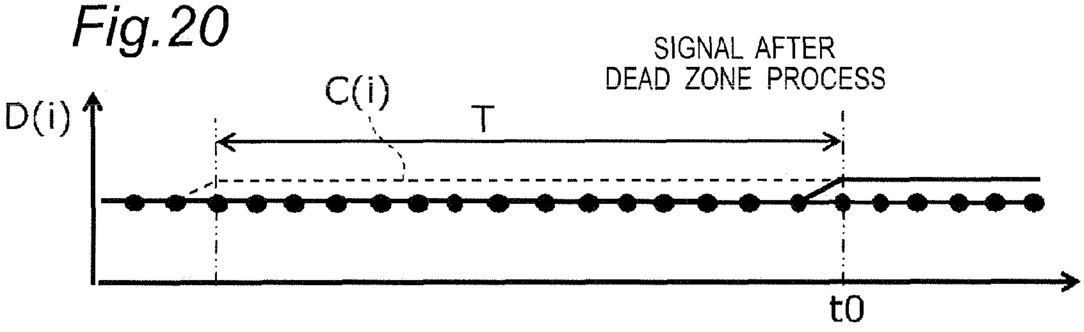
FIG. 20 is a diagram showing a change over time of a command value that is output from the dead zone processing unit of the control device at the time of occurrence of a low-amplitude command value that continues for a long time.

FIG. 20 is a diagram showing a change over time of a command value that is output from the dead zone processing unit 8 of the control device 4 at the time of occurrence of a low-amplitude command value that continues for a long time. In FIG. 20, there is occurrence of a low-amplitude command value that continues for a long time. In FIG. 20, the broken line indicates the third input value (the second output value C(i)), and the solid line indicates the third output value D(i). The duration of the signal-present step reaches the predetermined period of time T at a time point t0. After the time point t0, the duration is equal to or longer than the predetermined period of time T, and thus, the condition of the process P6 is satisfied.

When the process of the process P7 or P8 is finished, the execution flow of the dead zone process is ended. When the execution flow of the dead zone process is ended, the execution flow of the noise removal process and the moving average process is started again.

Effect of Present Embodiment

The engine rotational speed control device 4 according to the present embodiment achieves the following effects by the configurations described above.

(1) The engine rotational speed control device 4 according to the present embodiment includes the noise removal processing unit 6 for correcting a command value. The noise removal processing unit 6 is configured to set the current first output value B(i) to be identical to the previous first output value B(i−1) in the case where, in the latest step group, the number of successive increase steps is smaller than the first predetermined number N and the number of successive decrease steps is smaller than the first predetermined number N.

According to the configuration described above, in the case where the first input value A(i) is not continuously increased, and the first input value A(i) is not continuously decreased, the first input value A(i) is treated as a noise, and the previous first output value B(i−1) is maintained as the command value. Accordingly, the engine rotational speed control device 4 according to the present embodiment can remove a slight variation in the command value of the target rotational speed which is not intended by the operator. Accordingly, the control device 4 can prevent occurrence of hunting.

(2) The engine rotational speed control device 4 according to the present embodiment includes the moving average unit 7 and the dead zone processing unit 8. The moving average unit 7 is configured to calculate a moving average value based on the latest second input values (first output values B(i)) of the second predetermined number M, and to set a current second output value C(i) to be identical to the moving average value. The dead zone processing unit 8 is configured to set the current third output value C(i) to be identical to the previous third output value C(i−1) in the case where the current step is a small variation step.

Accordingly, the engine rotational speed control device 4 according to the present embodiment can remove a slight variation in the command value occurring due to a long-cycle, low-amplitude noise.

(3) With the engine rotational speed control device 4 according to the present embodiment, the dead zone processing unit 8 sets the current third output value C(i) to be identical to the current third input value (second output value B(i)) in the case where, in the latest step group, the duration of the signal-present step is equal to or longer than the predetermined period of time T.

Accordingly, the engine rotational speed control device 4 according to the present embodiment can, in the case where a slight variation in a command value continues for a long time, reflect the command value as a meaningful signal in the engine rotational speed without removing the command value as a noise.

EXPLANATION OF REFERENCE NUMERALS

1: Engine
2: Operation lever (operation device)
3: AD conversion device
4: Engine rotational speed control device
5: Throttle valve
6: Noise removal processing unit
7: Moving average unit
8: Dead zone processing unit
9: Throttle opening calculation unit
m: Second set width
n: First set width
A(i): Current first input value
A(i−1): Previous first input value
B(i): Current first output value (current second input value)
B(i−1): Previous first output value
C(i): Current second output value (current third input value)
C(i−1): Previous second output value
D(i): Current third output value
D(i−1): Previous third output value
M: Second predetermined number
N: First predetermined number
T: Predetermined period of time

The invention claimed is:

1. An engine rotational speed control device for controlling an amount of fuel supply based on a command value of target rotational speed generated for each step per unit time by digital converting an analog value of the target rotational speed input by an operation device, the engine rotational speed control device comprising:

a noise removal processing unit which corrects the command value, a first input value being the command value that is input to the noise removal processing unit, and a first output value being the command value that is output from the noise removal processing unit, wherein the noise removal processing unit is configured to set a current first output value to be identical to a current first output value in a case where, in a latest step group, the number of successive increase steps is equal to or greater than a first predetermined number or the number of successive decrease steps is equal to or greater than the first predetermined number, and to set a current first output value to be identical to a previous first output value in a case where the number of successive increase steps is neither equal to nor greater than the first predetermined number and the number of successive decrease steps is neither equal to nor greater than the first predetermined number, the increase step is the step in which the current first input value is greater than the previous first output value by a first set width or more, and the decrease step is the step in which the current first input value is smaller than the previous first output value by the first set width or more; and a moving average unit which corrects the command value that is the first output value after correction by the noise removal processing unit, a second input value being the command value that is input to the moving average unit and that is identical to the first output value, a second output value being the command value that is output from the moving average unit, wherein the moving average unit is configured to calculate a moving average value based on a latest second predetermined number of the second input values, and to set a current second output value to be identical to the moving average value.

2. The engine rotational speed control device according to claim 1, comprising:

a dead zone processing unit which corrects the command value corrected by the noise removal processing unit, a third input value being the command value that is input to the dead zone processing unit and that is identical to the second output value, and a third output value being the command value that is output from the dead zone processing unit, wherein the dead zone processing unit is configured to set a current third output value to be identical to a previous third output value in a case where a current step is a small variation step, and the small variation step is the step in which an absolute value of difference between a current third input value and the previous third output value is smaller than a second set width.

3. The engine rotational speed control device according to claim 2, wherein the dead zone processing unit is configured to set the current third output value to be identical to the current third input value instead of setting the current third output value to be identical to the previous third output value in a case where, in a latest step group, duration of a signal-present step is equal to or longer than a predetermined period of time, and the signal-present step is the small variation step in which the absolute value of the difference between the current third input value and the previous third output value is greater than zero.

* * * * *